United States Patent [19]

Lhotak

[11] Patent Number: 5,736,989
[45] Date of Patent: Apr. 7, 1998

[54] SYSTEM AND METHOD FOR MINIMIZING COLOR INTERPOLATION TABLES

[75] Inventor: Vladimir Lhotak, Santa Clara, Calif.

[73] Assignee: Apple Computer, Inc., Cupertino, Calif.

[21] Appl. No.: 587,851

[22] Filed: Jan. 11, 1996

[51] Int. Cl.⁶ .................................................. G06T 1/60
[52] U.S. Cl. ....................... 345/431; 345/138; 345/514
[58] Field of Search ............................ 395/131, 514; 345/138, 150; 364/723

[56] References Cited

U.S. PATENT DOCUMENTS

| | | | |
|---|---|---|---|
| 5,195,180 | 3/1993 | Takakura et al. | 395/514 X |
| 5,469,551 | 11/1995 | Sites et al. | 395/586 |
| 5,537,579 | 7/1996 | Hiroyuki | 395/131 |
| 5,613,103 | 3/1997 | Nobutani et al. | 395/514 X |
| 5,666,436 | 9/1997 | Eames | 382/167 |

*Primary Examiner*—Mark K. Zimmerman
*Attorney, Agent, or Firm*—Burns, Doane, Swecker & Mathis, L.L.P.

[57] ABSTRACT

Color conversion systems and methods using an interpolation table that minimizes interpolation color value generation times and reduces memory storage of interpolation tables. A first color conversion method and system reduces interpolation table generation times by generating interpolation color values on an "as needed" basis while performing color conversions. A second color conversion method minimizes interpolation table memory storage by dividing the interpolation table into segments, allocating primary memory storage to store only a given number of segments and establishing a segment status bit array to indicate whether a given segment is currently stored in primary memory. A third system and method combines both the first and second methods so that both interpolation table generation times and table memory storage is reduced.

20 Claims, 7 Drawing Sheets

SYSTEM AND METHOD FOR MINIMIZING COLOR INTERPOLATION TABLES

FIELD OF THE INVENTION

The present invention relates to systems performing color conversions using interpolation.

BACKGROUND OF THE INVENTION

In a computer system, color information (typically in the form of a digital color value) that is passed from a first device (also referred to as a source device) to a second device (also referred to as a destination device) is typically converted so that color consistency is maintained throughout the system. The reason for this conversion is that each device has a unique manner in which to display and represent colors. For instance, a computer monitor may display colors by using a phosphorous screen. On the other hand, a printer uses ink. In addition, each device may have different associated color spaces. For instance, one common color space employed when displaying color on a monitor is the RGB (red, green, and blue) color space. Printers, on the other hand, often use a CMYK (cyan, magenta, yellow, and black) color space.

There are many manners in which color conversion can be performed. One technique employs a look-up table which is stored in memory. The table comprises a destination device color value for each source device color value to be converted. The values stored in the look-up table are generated prior to any color conversions by determining the function that defines the relationship between the source and destination device color spaces and performing computations corresponding to these functions on each of the source color values to generate a look-up table destination device color value. In this case, the look-up table provides a one-to-one mapping between the source and destination device color values. Conversion is performed by accessing the previously created look-up table with source color values corresponding to a given image and outputting look-up table destination device color values. The problem with this technique of color conversion is that the gamut, (i.e. the range of color values that a given display device is capable of generating) may be very large, thereby making it impractical to store a corresponding destination device color value for each source device color value. For instance, if the source device is a color monitor using an RGB color space having three components (i.e. red, green, and blue) and each component is represented by an 8-bit digital word, the look-up table would need to store $2^{24}$ possible color values.

In order to avoid this problem, a different prior art technique of color conversion is performed that uses a table (referred to as an interpolation table) that stores only a representative sampling of color values defining the relationship between the source and destination device's color spaces. As with the look-up table, the interpolation table is generated before color conversion is performed and stored in working memory, i.e. RAM. When performing color conversion using an interpolation table, the source color value to be converted is coupled to an interpolation unit (implemented either in hardware or software). The unit uses the original source color value to determine which color values from the interpolation table it needs to perform interpolation calculations. Next, it accesses the required interpolation values from the interpolation table and uses them to perform the interpolation calculations on the source color value to generate a final destination device color value.

The drawbacks to performing color conversion using an interpolation table are two-fold. First, the amount of error introduced into the final destination color value when performing the interpolation calculations depends on the number of values stored in the interpolation table. Consequently, there is a trade-off between conversion accuracy and the number of values stored in the interpolation table (and hence, the amount of memory used by the interpolation table.) As is well known in the field of system design, reducing memory space requirements is often a crucial system design consideration. However, too large of a color conversion error can result in a visual difference between the source and destination device colors.

A second problem associated with performing color conversion with an interpolation table is that the amount of time needed to initially generate the interpolation table prior to performing any conversions depends on the number of values to be stored in the interpolation table. If color conversion is being performed between a single given destination device color space and a variety of different source device color spaces, it is necessary to generate a new interpolation table defining the color space relationship between each new source device color space and the given destination device color space. For instance, if a printer prints an image provided by a monitor, for example, an interpolation table is generated corresponding to the relationship between the printer and the monitor before performing any color conversions on the image data. If the printer needs to print a subsequent image originating from a scanner, a new interpolation table needs to be generated prior to performing any color conversion. The time it takes to generate an interpolation table can become relatively long. Further, when a function defining the source and destination devices is highly non-linear, more values are needed in the interpolation table and consequently longer interpolation table generation times occur. Furthermore, these tables are generated in response to a user-initiated print request. Consequently, the user must wait for an entire interpolation table to be generated before printing can take place.

Thus, it would be desirable to reduce the amount of memory space and time needed to perform color conversion when employing interpolation tables while maintaining color conversion accuracy.

SUMMARY OF THE INVENTION

The present invention is a method and system for reducing computation time and memory space required to generate and store color conversion interpolation tables.

In the first embodiment of the present invention, interpolation table generation time is reduced by generating interpolation values on an "as needed" basis. In this embodiment, a memory area large enough to store all possible interpolation values is allocated for (but not filled with) valid interpolation values. The allocated memory area includes indexable memory locations—each indexable memory location corresponding to a different location within the interpolation table. This embodiment also includes a status bit array—each status bit corresponding to a location in the table. Each status bit indicates whether valid data is stored in the allocated memory for a particular interpolation table location.

Since the data stored in the allocated memory area is uninitialized prior to performing any color conversions of source color values, all of the status bits indicate invalid data. In one embodiment, an invalid state is represented by a logical "0" and a valid state is represented by a logical "1". Color conversion of the source color value into a destination color value using interpolation is performed by: 1) determining which locations in the interpolation table hold the interpolation color values required to perform the interpolation calculations; 2) for each determined location in step 1), checking the status bit for the determined location; 3) if the status bit is valid, then the color value stored in the allocated memory is usable for performing the interpolation computations; 4) if the status bit is invalid then generating the required interpolation table color value, storing it into the allocated memory, and setting the status bit to be valid; 5) once all of the status bits indicate valid data for all of the required interpolation color values, performing the interpolation calculations on the source color value to generate an interpolated destination device color value.

In a second embodiment, the present invention reduces the amount of primary memory space consumed by the interpolation table by using both primary memory storage (such as RAM) and secondary memory storage (such as a magnetic disk). In this embodiment, the interpolation table is viewed as being divided into segments of color values. A primary memory area is allocated to store only a given number of table segments at one time. When new segments need to be stored in the primary memory, segments currently stored in the primary memory are written out to secondary memory. This embodiment includes a segment status bit array. Each status bit in the array indicates whether the segment containing the required interpolation color values to perform the interpolation calculation is stored within the primary memory. In one embodiment, the interpolation table segments are either vertical or horizontal slices of values of the interpolation table and in another embodiment the interpolation table is divided into unit cubes of values.

In this second embodiment, prior to any color conversions, all of the bits in the segment status bit array indicate invalid segments since none of the segment interpolation values have been computed. Color conversions are performed by: 1) determining which segments are required to perform the interpolation calculations; 2) for each required segment, checking the segment status bit to see whether the required segment is stored in primary memory (i.e. status bit valid or invalid); 3) if the status bit is invalid, either retrieving a previously generated required segment from secondary memory, or generating the interpolation values for a required segment; 4) storing the retrieved or generated required segment values into primary memory; 5) if allocated primary memory has a maximum number of segments, storing a segment that is not required to perform the interpolation calculation into secondary memory and storing the required segment into primary memory in its place; 6) setting the status bit to valid for the segment stored in primary memory and setting the status bit to invalid for the displaced segment; 7) once all required segments are in primary memory, performing interpolation calculations to generate a destination color value.

In a third embodiment, instead of storing and retrieving segments to and from secondary memory, displaced segments are just written over in the primary memory and whenever a segment is not found in primary memory, it is generated. Thus, in this embodiment, color conversions are performed by: 1) determining which segments are required to perform the interpolation calculations; 2) for each required segment, checking the segment status bit to see whether the required segment is stored in primary memory (i.e. status bit is valid or invalid); 3) if the status bit is invalid, generating the required segment values; 4) storing the generated segment values in primary memory; 5) if primary memory has a maximum number of segments, writing the required segment over a previously generated segment; 6) setting the status bit to valid for the segment stored in primary memory and setting the status bit to invalid for the discarded segment; 7) once all of the required segments are in primary memory, performing interpolation calculations to generate a destination color value.

In a fourth embodiment of the present invention both memory space and interpolation color value generation time are reduced by combining the first embodiment with either of the second or third embodiments of the present invention. This embodiment includes two bit arrays—a segment status bit array for indicating whether the required segment for performing the interpolation calculations is stored within the primary memory and a color value status bit array for indicating whether the required value for performing the interpolation calculation within the required segment is valid.

Prior to performing any color conversions according to the fourth embodiment, all of the bits in the segment status bit array indicate invalid segments since none of the segments have been stored into primary memory and all of the status bits in the color value bit array indicate invalid data. Color conversions are performed by 1) determining which segments are required to perform the interpolation calculations, 2) for each required segment, checking the segment status bit to see whether the required segment is stored in primary memory (i.e. segment status bit is valid or invalid), 3a) if the status bit is invalid and the required segment was previously stored in secondary memory, retrieving the segment from secondary memory and storing it into primary memory, 3b) if the status bit is invalid and the required segment was not previously stored in secondary memory, allocating a portion of primary memory for the required segment, 4) if the primary memory has maximum number of segments, first, discarding one segment that is not required to perform the interpolation calculation (or storing to secondary memory) and storing the required segment into primary memory from secondary memory or in the case in which the required segment is not stored in secondary memory allocating a segment of primary memory for the required segment, 5) setting a status bit to indicate a valid segment for the required segment stored in primary memory and setting a status bit to indicate an invalid segment for any discarded segment or segment stored to secondary memory, 6) for each required color value in each required segment, checking the color value status bit array for the status of the color value required to perform the interpolation calculations, 7) if invalid, generating the required interpolation value and setting the corresponding color value status bit to valid, 8) once all of the required segments are in primary memory and all required interpolation value status bits indicate valid data, performing the interpolation calculations to generate the destination device color value.

DETAILED DESCRIPTION

Figure 1:
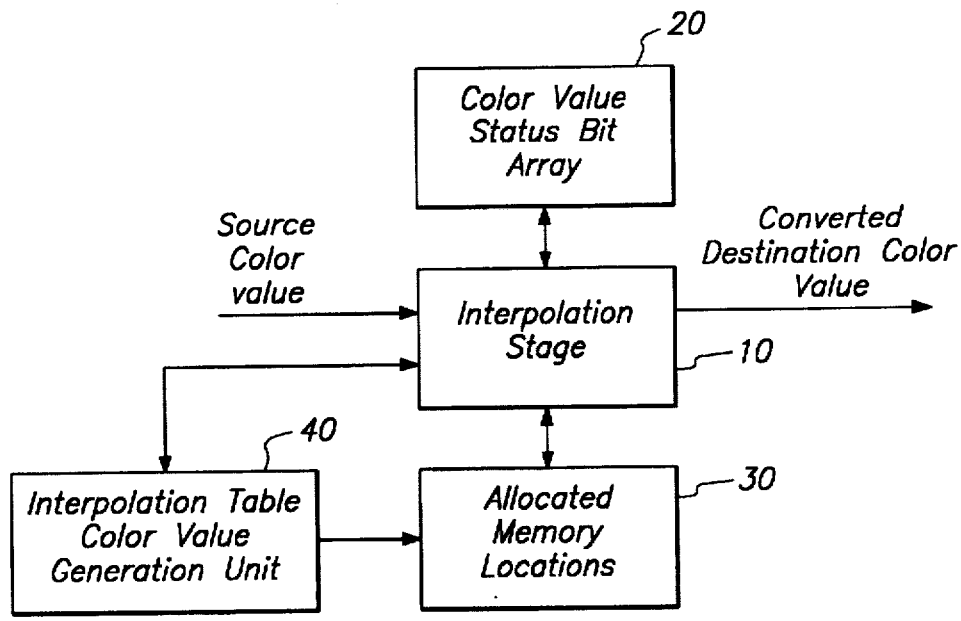
FIG. 1 is a block diagram illustrating a first embodiment of the system of the present invention for interpolating color values while reducing interpolation table value generation times employing a color value status bit array.

The present invention provides an interpolation-type color conversion method and system for minimizing conversion times and for minimizing interpolation table memory usage. In the following description, numerous specific details are set forth, such as specific sequences and steps, in order to provide a thorough understanding of the present invention. It will be obvious, however, to one skilled in the art that these specific details need not be employed to practice the present invention. In other instances, well-known computer system architectures and digital signal processing techniques have not been described in detail in order to avoid unnecessarily obscuring the present invention.

In prior art color conversion systems that perform color conversions using an interpolation table, a complete set of interpolation table color values is generated and stored in primary memory. In this prior art method, to convert a source color value into a destination color, a group of interpolation table values (typically eight) are accessed from primary memory and are used (along with the source color value) to perform interpolation calculations to generate the destination color value. This technique holds two disadvantages, the first being that the time it takes to initially generate an interpolation table can be relatively long with respect to other color conversion processing times, thereby significantly adding to overall color conversion times. Furthermore, since it is often necessary to create new interpolation tables for convening images having different color spaces or when switching source devices, many interpolation tables may need to be generated, thereby further increasing processing times of the color conversion process. The second disadvantage to this prior art method is that interpolation tables consume relatively large amounts of primary memory space. This is true in the case in which the function defining the relationship between the source and destination device is linear, but is particularly true in the case in which the function between the source and destination devices is non-linear and the interpolation table requires many more values to ensure an accurate color conversion.

The various embodiments of the present invention address both of the disadvantages exhibited by the prior art color conversion technique. In a first embodiment of the present invention, the color conversion system of the present invention reduces interpolation color value generation times by taking into consideration that when performing interpolation calculations on a serial stream of source color values associated with a given image, only a certain number of the interpolation values from the interpolation table are used. Consequently, a large number of interpolation values are unnecessarily generated in the prior art method when the table is initially generated. With this in mind, the first embodiment of the present invention reduces interpolation table color value generation times by generating values on an "as needed" basis. Thus, the basic concept of the first embodiment of the present invention is to convert each source color value of a given image, by first ascertaining which interpolation table color values are required to perform the interpolation calculations on the source color value, generating these interpolation values, performing the interpolation calculations, and then storing the interpolation values into an allocated memory space capable of storing a complete interpolation table. In this way, only the interpolation table color values that are required to perform the interpolation calculations are generated to convert a set of color values for a given image. If subsequent images are converted (assuming the same source and destination devices), more interpolation color values may be added to the table depending on the interpolation color values needed to perform the calculations.

Referring to FIG. 1, to implement the concepts of the first embodiment of the present invention, memory space 30 having a set of indexable memory locations, each corresponding to one interpolation table value, is allocated within primary memory, but initially none of the values stored in the allocated memory prior to color conversions are valid. Color value status bit array 20 indicates whether the interpolation color value data stored within the allocated memory is valid (i.e. already generated from a previous interpolation calculation) or invalid (i.e. not generated yet). Each bit in status array 20 corresponds to one interpolation table location. Since memory space 30 is uninitialized prior to performing any conversions, all of the color value status bits are in an invalid state.

Each of the set of color values associated with a given source I/O device image are sequentially processed by interpolation stage 10. Thus, for each given source color value, interpolation stage 10 determines the location within the interpolation table of each interpolation color value required to perform the interpolation calculations on the given source color value to convert it into a corresponding destination device color value. Next, stage 10 checks status bit array 20 to determine whether the data stored in the allocated memory corresponding to the determined locations for each of the required color values is valid. If the data is invalid, the interpolation stage 10 signals interpolation table color value generation unit 40 to generate the required color value. The color value generation unit 40 performs computations corresponding to the function defining the relationship between the source and destination device color spaces on a source value to obtain the valid interpolation color value. Then unit 40 provides this valid value to stage 10. The status bit in array 20 corresponding to the generated interpolation color value is then set to a valid state. Once the status bits in array 20 indicate that the data stored in allocated memory 30 for all of the required color values is valid, interpolation stage 10 performs interpolation calculations using the source color value and the required interpolation table color values to generate a destination color value.

It should be noted that both interpolation stage 10 and generation stage 40 perform certain predefined functions to implement the method and system of the present invention. It should be well known in the field of circuit design that logic stages such as stages 10 and 40 can be implemented using design techniques such as software algorithms, function specific hardware circuit designs, or multi-purpose processor designs to perform the designated set of functions for each stage.

Figure 4:
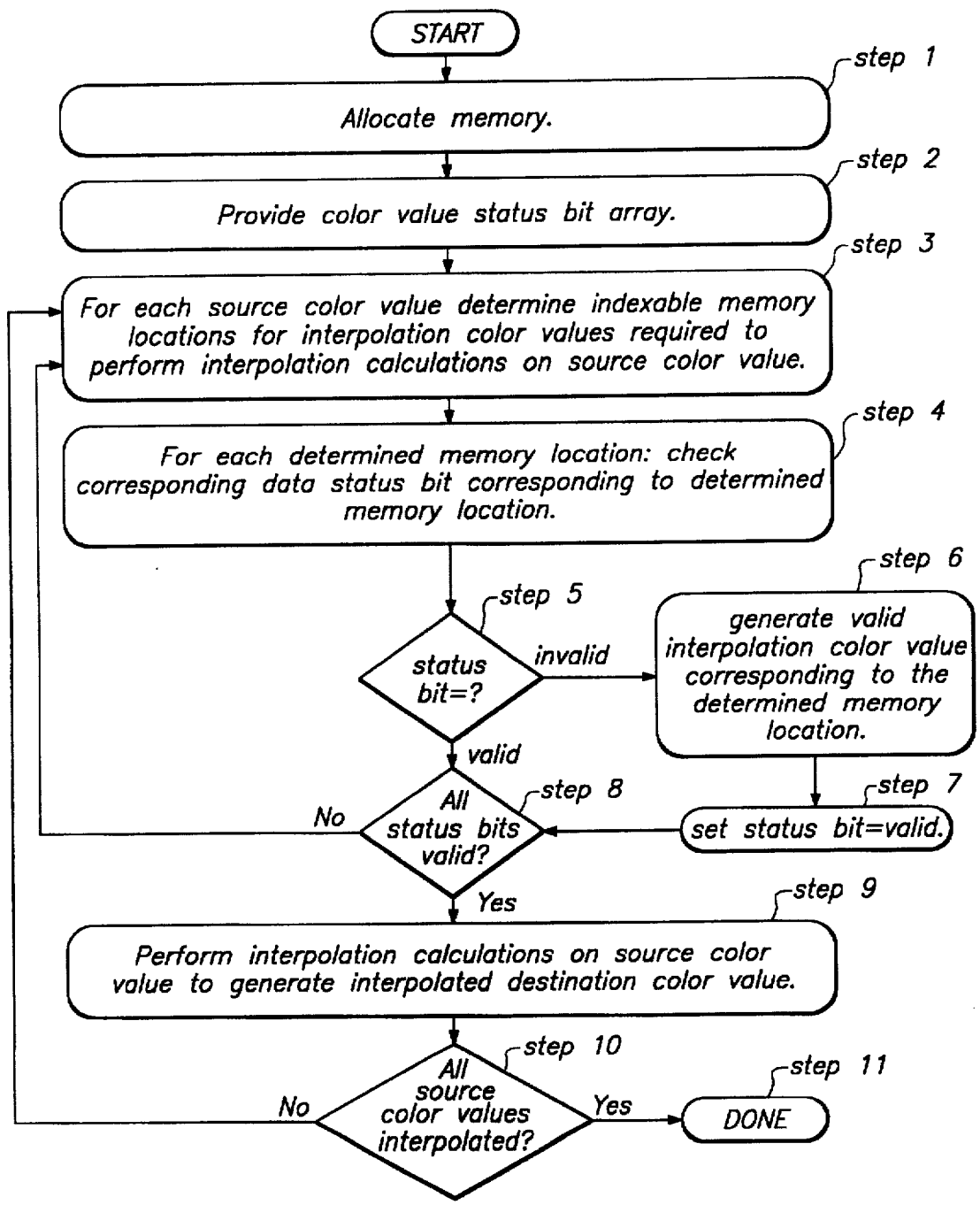
FIG. 4 is a flow chart illustrating the steps of one embodiment of the method of the present invention corresponding to the system embodiment shown in FIG. 1.

FIG. 4 illustrates the steps of one embodiment of the method of the present invention in accordance with the system embodiment shown in FIG. 1. Prior to performing any color conversions, a memory area is allocated (step 1) for storing an interpolation table representing the mathematical function defining the color characteristic relationship between the source and destination devices—each location corresponding to one interpolation color value. Further, a color value status bit array is established (step 2) where each bit in the array corresponds to one location within the interpolation table and indicates the validity of the data stored in the allocated memory for that location. Next, for each source color value, the interpolation table locations corresponding to the interpolation color values required to perform the interpolation calculations are determined (step 3). For each determined location, the corresponding status bit in the color value status array is checked (step 4). If the status bit array indicates invalid data for one of the locations (step 5), an interpolation color value is generated that corresponds to that location (step 6) and the status bit for that location is set to a valid state (step 7). Steps 6 and 7 are performed on all required color values until all corresponding status bits indicate valid data (step 8). Next, interpolation calculations are performed using the required interpolation color values and the source color value to generate a destination color value (step 9). If all of the source color values for the image have been processed through steps 3–9 the conversion of the image is complete, if not then the next image source color value is processed through steps 3–9 until all values are processed (step 10).

As can be seen in performing color conversions in this manner, only the interpolation color values required to convert the image are generated. This significantly reduces the overall conversion time since a complete interpolation table need not be generated. Furthermore, the status bit array consumes a very small amount of space.

Figure 2:
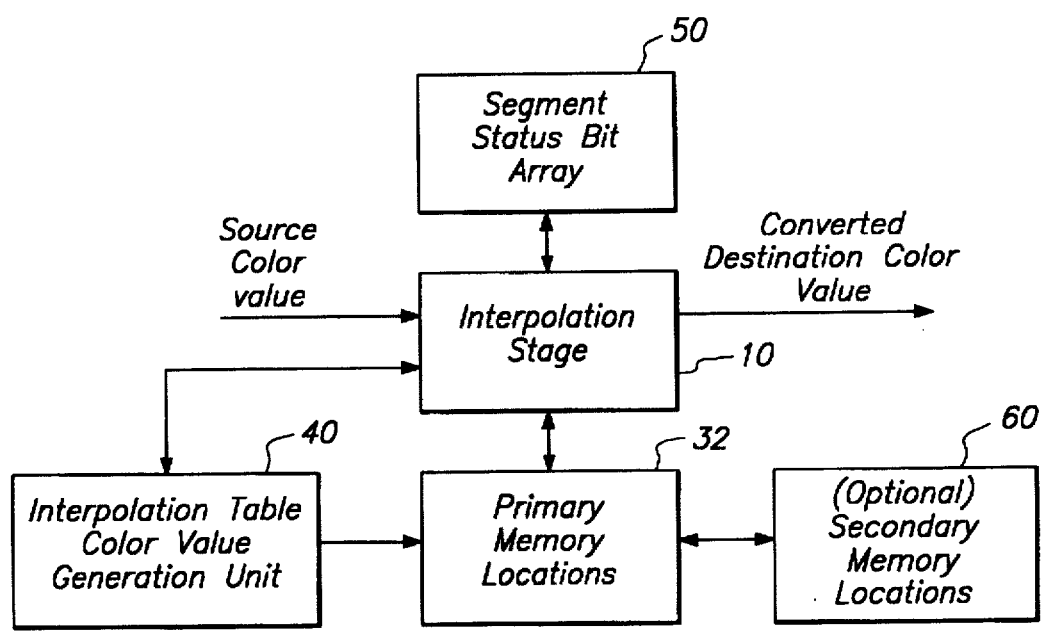
FIG. 2 is a block diagram illustrating a second embodiment of the system of the present invention for interpolating color values while reducing the amount of primary memory space consumed by the interpolation table employing a segment status bit array.

FIG. 2 illustrates a second embodiment of the present invention that is designed to reduce the amount of primary memory space (e.g. RAM) used by an interpolation table when converting colors using an interpolation-type color conversion technique. In this embodiment, the interpolation table is viewed as being made-up of a set of segments—each segment consisting of a group of interpolation color values. For instance, in one embodiment the interpolation table can be segmented into same-sized vertical or horizontal slices. In another embodiment, the table may be segmented into unit cubes. The memory area allocated in primary memory 32 for storing interpolation table segments stores only a given number of the total number of segments that the interpolation table is divided into. This embodiment also includes a segment status bit array. Each bit in the array corresponds to one of the interpolation table segments and each bit indicates whether its corresponding segment is currently stored in primary memory (i.e. valid), or not stored in primary memory (i.e. invalid). This embodiment can also include optional secondary (e.g. disk) memory 60 for storing segments that are not being used to perform the current interpolation calculations, however in another embodiment, secondary memory is not required.

The following is a description of the embodiment shown in FIG. 2 which does not employ secondary memory. Each of the set of color values associated with a given source I/O device image are sequentially processed by interpolation stage 10. For each given source color value, interpolation stage 10 determines which interpolation color values are required to perform the interpolation calculations on the given source color value and the segment(s) containing the required color values. Next, stage 10 checks segment status bit array 50 to determine whether the required segments are stored in primary memory 32. If the segment is not in primary memory 32 (i.e. indicated by an invalid status bit), interpolation stage 10 indicates to the interpolation table color value generation unit 40 to generate all of the color values in the required segment. Color value generation unit 40 generates the values in the segment, stores the segment values into primary memory and sets the status bit in array 50 to indicate a valid segment. In the case in which the primary memory is full, the newly generated segment is written-over any previously stored segment that is not being used to perform the current interpolation calculations. In this case the status bit corresponding to the written over segment is now set to an invalid state while the status bit corresponding to the current required segment is set to a valid state. Once the status bits in array 50 indicate that all required segments are valid, interpolation stage 10 performs interpolation calculations using the source color value and the required interpolation table values in each segment to generate a destination color value.

The embodiment of the present invention shown in FIG. 2 can also be implemented with optional secondary memory 60. Secondary Memory 60 is used such that when a primary memory is full when a required segment is being loaded into primary memory, a segment not required to perform the current interpolation calculations is written out to the secondary memory and the new required segment is stored in its place. The segment status bit for the displaced segment is then set to an invalid state and the status bit for the current required segment is set to a valid state. In this embodiment, the segment status bit array 50 and primary memory 32 are established in the same manner. Further, interpolation color value unit 40 also performs the same function. The difference is that after interpolation stage 10 determines the required segments for performing the interpolation calculations and the status bit array indicates that the segment is not stored in primary memory (i.e. invalid segment), the interpolation stage next checks to see if the required segment is stored in secondary memory. If the required segment is in secondary memory, it is loaded into primary memory and the status bit for this segment is set to indicate a valid segment. However, if the required segment is not in either primary or secondary memory, the interpolation color value generation unit 40 generates the all of the color values in the required segment. The generated segment is then loaded into primary memory and its corresponding segment status bit is set to a valid state. Once all required segments are stored in primary memory, interpolation stage 10 performs the interpolation calculations to generate destination device color value.

Figure 5:
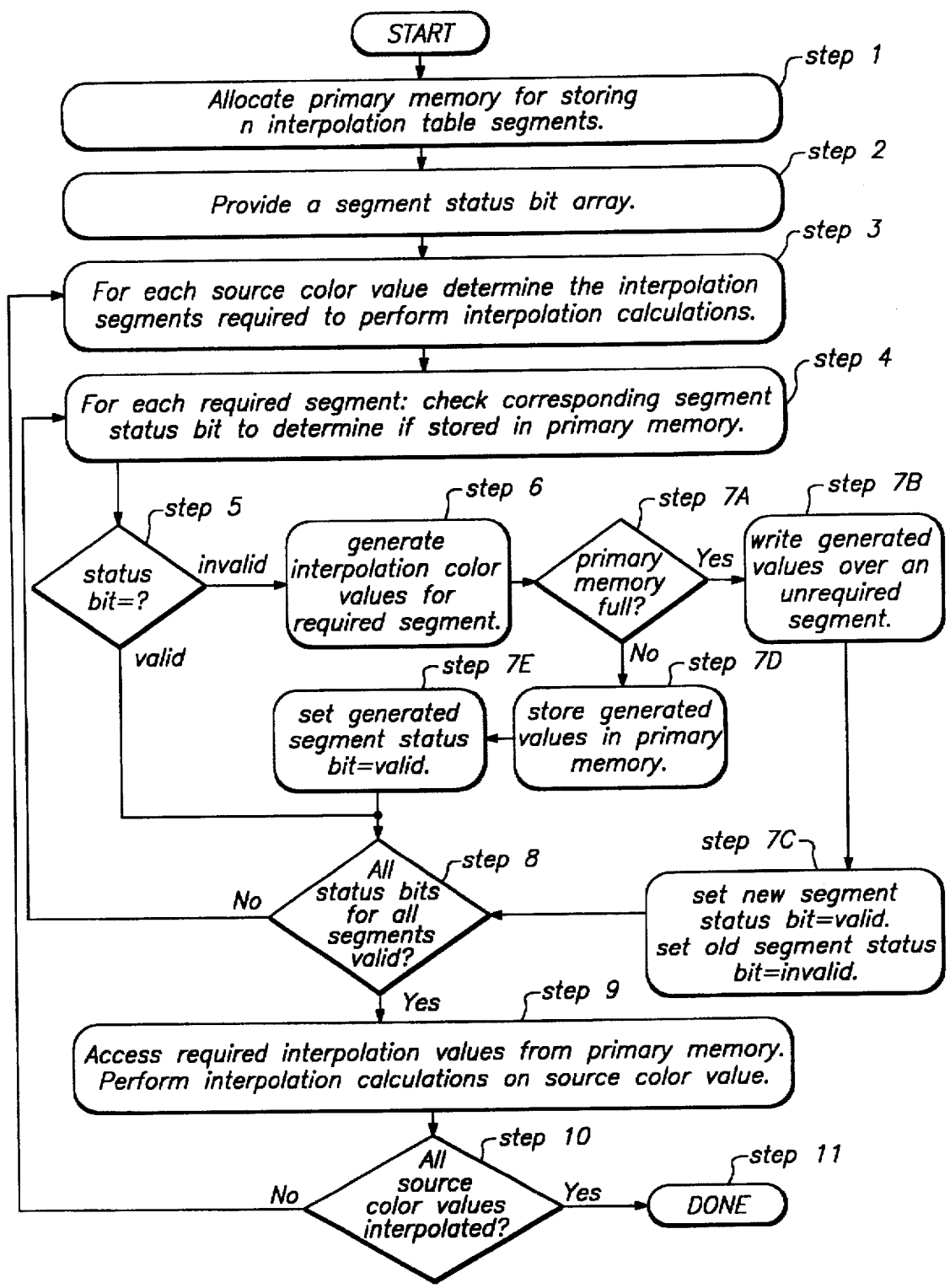
FIG. 5 is a flow chart illustrating the steps of one embodiment of the method of the present invention corresponding to the system embodiment shown in FIG. 2 which does not employ optional secondary memory.

FIG. 5 illustrates the steps of one embodiment of the method of the present invention in accordance with the system shown in FIG. 2 which uses only primary memory. Prior, to performing any color conversions, a primary memory area is allocated (step 1) for storing n interpolation table segments. Further, a segment status bit array is established (step 2) where each bit in the array corresponds to one segment of the interpolation table and indicates whether the segment is stored in primary memory. Next, for each source color value, the segments containing the interpolation color values required to perform the interpolation calculations are determined (step 3). In step 4, for each required segment, the corresponding status bit in the segment status array is checked. If the status bit array indicates an invalid segment (step 5), the required segment of interpolation color values is generated (step 6). Next, if the primary memory is not full, the segment is stored into primary memory and the status bit for that segment is set to a valid state (steps 7A, 7D and 7E). If the primary memory is full, the current required segment is written over an old segment not required to perform the current interpolation calculations, the status bit for the current required segment is set valid, and the status bit for the written over old segment is set to an invalid state (steps 7A, 7B and 7C). Steps 5, 6 and 7 are performed until all of the status bits for all of the required segments indicate a valid state (step 8). Once all of the segments are stored in primary memory (i.e. all of the required segments have corresponding valid status bits), the interpolation calculations are performed by accessing the required values within the required segments to generate a destination color value (step 9). If all of the source color values for the image have been processed through steps 3–9 then the conversion is done, if not then the next image source color value is processed through steps 3–9 until all values are processed (step 10).

Figure 6:
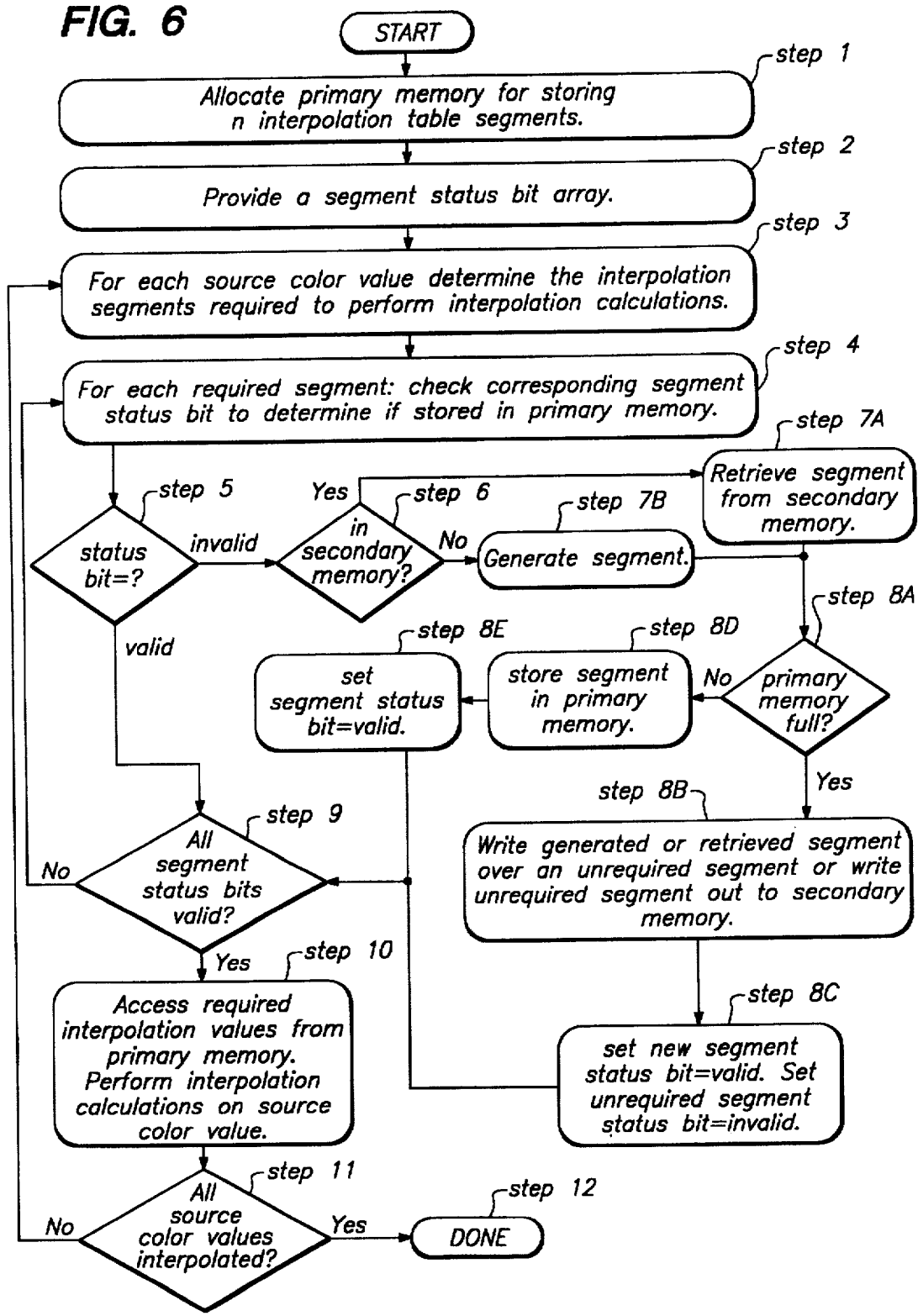
FIG. 6 is a flow chart illustrating the steps of one embodiment of the method of the present invention corresponding to the system embodiment shown in FIG. 2 which employs optional secondary memory.

FIG. 6 illustrates the steps of one embodiment of the method of the present invention in accordance with the system shown in FIG. 2 which uses both primary and secondary memory. Steps 1–5 of the method shown in FIG. 6 are essentially the same as that shown in FIG. 5. That is, a primary memory area is allocated (step 1) for storing n interpolation table segments and a segment status bit array is established (step 2). In step 3, the required segments are determined and in step 4 the status bit for each required segment is checked. If the status bit array indicates an invalid segment (step 5), a determination is made whether the required segment is in secondary memory (step 6). Determining whether a segment is stored in secondary memory can be accomplished using a secondary memory segment status bit array. However, it is well understood in the field of digital circuit design and digital signal processing that many other techniques for determining whether the required segment is stored in secondary memory area can be employed. If the required segment is in secondary memory it is retrieved from secondary memory (step 7A). If the required segment is not in secondary memory the interpolation color values for the required segment are generated (step 7B). Next, the required segment is stored into primary memory. If the allocated memory area for the interpolation segments in primary memory is full, (step 8A) an unrequired segment is written out to secondary memory (step 8B), the status bit for the required segment is set valid, and the status bit for the displaced segment is set invalid (step 8C). If the primary memory is not full, the required segment is stored into the primary memory (step 8D) and the status bit for that segment is set valid (step 8E). Steps 5–9 are performed until all of the status bits for all of the required segments indicate a valid state. Once all of the segments are stored in primary memory (i.e. all of the required segments have corresponding valid status bits) step 9, interpolation calculations are performed by accessing the required values within the required segments to generate a destination color value (steps 10 and 11 ). If all of the source color values for the image have been processed through steps 3–10 then the conversion is done, if not then the next image source color value is processed through steps 3–10 until all image values are processed (step 11).

As can be seen, this embodiment uses less primary memory compared to prior art methods and systems since only a portion of the interpolation table is stored in primary memory at one time. In the case of an interpolation table having a relatively large number of color values, a significant memory space savings can be realized.

Figure 3:
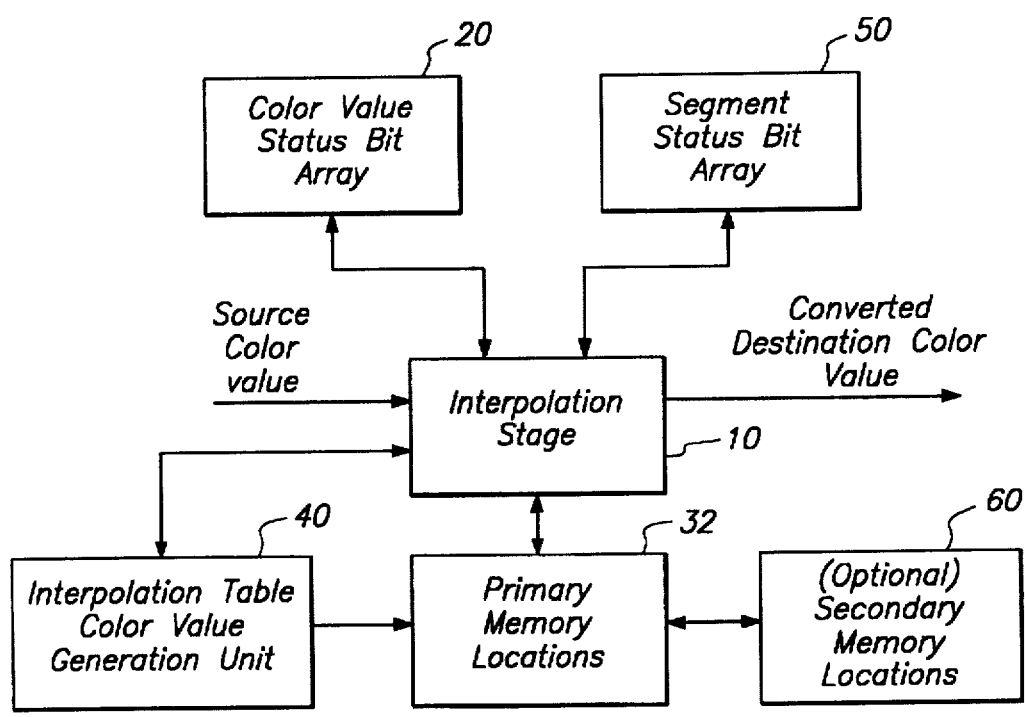
FIG. 3 is a block illustrating a third embodiment of the system of the present invention for interpolating color values while reducing the interpolation value generation time and the amount of memory space consumed by the interpolation table using both a color value status bit array and a segment status bit array.

FIG. 3 illustrates a third embodiment of the present invention combining the reduced interpolation table generation time aspect of the present invention as shown in FIG. 1 and the reduced interpolation table memory space usage aspect as shown in FIG. 2. Hence, this embodiment not only reduces interpolation value generation times by only generating the interpolation values on an "as needed" basis, it also reduces memory usage by storing only a portion of the generated interpolation values in primary memory at one time.

Figure 7A:
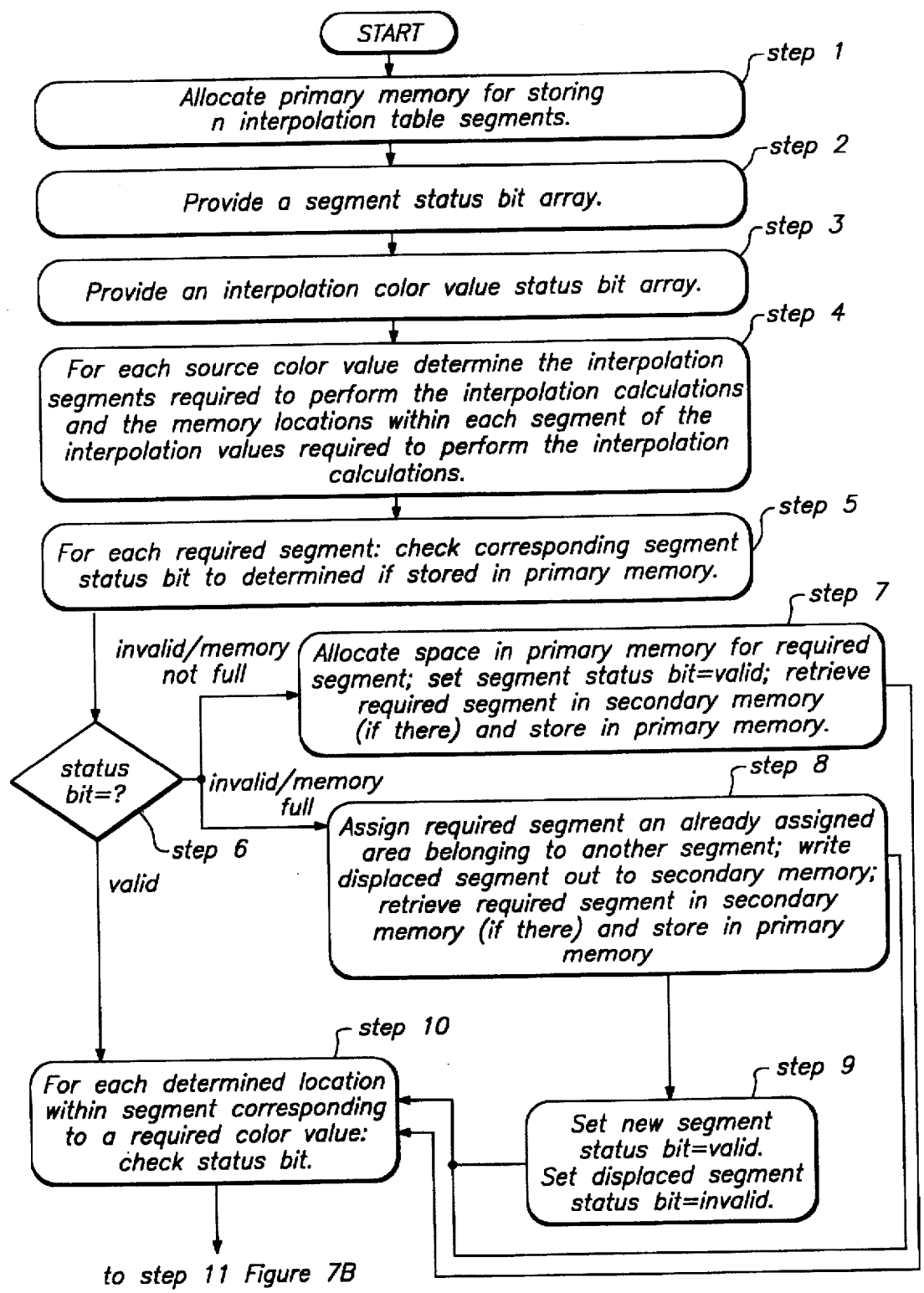
FIG. 7A is a flow chart illustrating the steps of one embodiment of the method of the present invention corresponding to the embodiment shown in FIG. 3 using secondary memory.
Figure 7B:
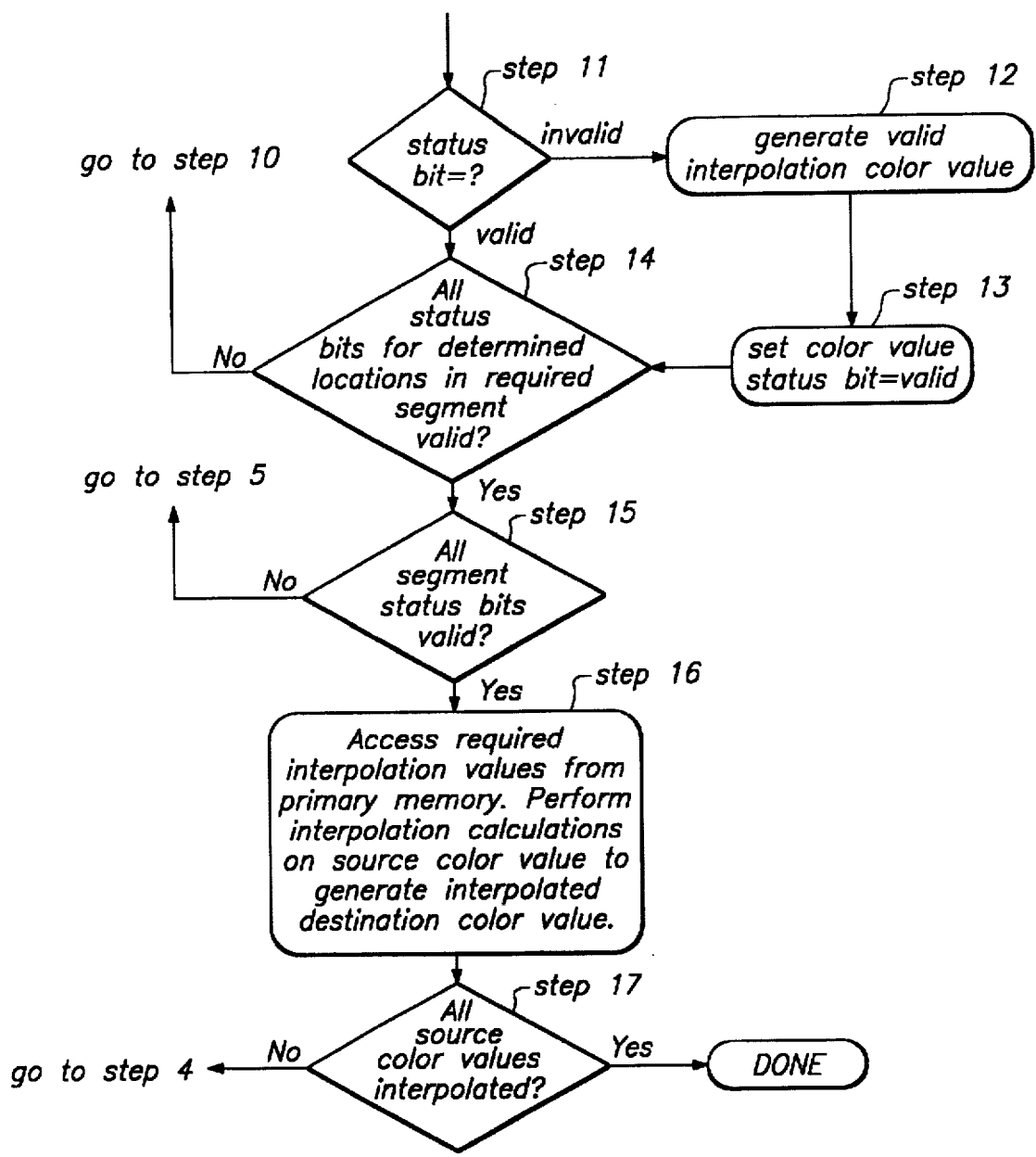
FIG. 7B is a flow chart illustrating a continuation of the steps of the method shown in FIG. 7A.

As shown in FIG. 3, this embodiment includes two status arrays, color value status bit array 20 and segment status bit array 50, as well as interpolation stage 10, primary memory locations 32, optional secondary memory location 60, and interpolation table color value generation unit 40. FIGS. 7A and 7B illustrate the steps of one color conversion method of the present invention in accordance with the system embodiment shown in FIG. 3 in which secondary memory 60 is employed. Initially, a primary memory area is allocated for storing n segments from the interpolation table (step 1). For instance primary memory can be allocated to store no more than five of the interpolation table segments. Alternatively, if the size of the slices are large (i.e. each slice holds many interpolation color values), only enough primary memory may be allocated to hold a single segment of interpolation table values.

Steps 2 and 3 require that a segment status bit array and color value status bit array be established. As with the previous embodiments, segment status bit array 50 indicates whether a particular interpolation table segment is stored in primary memory. Each color value status bit corresponds to one interpolation color value within the interpolation table and indicates the validity of the data stored in the primary memory corresponding with the interpolation color value.

For each source color value to be converted into a destination color value, interpolation stage 10 determines which segment(s) contain the interpolation table color values required to perform the interpolation calculations on the source color value and the locations within the interpolation table segment stored in the allocated primary memory that hold the required interpolation table color values (step 4).

Steps 5–15 are performed for each required segment to determine whether 1) the required segment is stored within primary memory (i.e. valid segment status bit) and 2) and for each required interpolation color value within each required segment, whether the locations within the interpolation table segment stored in primary memory corresponding to the required interpolation color values are valid data (i.e. valid color value status bit).

In step 5, segment status array 50 is checked to determine if the segment is valid. If the segment status bit for the required segment is invalid and primary memory is not full (steps 6 and 7), a space is allocated in primary memory for the required segment and its corresponding segment status bit is set to a valid state. Furthermore, if the required segment is stored in secondary memory, it is retrieved from secondary memory and stored in the allocated space. If the segment status bit for the required segment is invalid and primary memory is full (steps 6 and 8), i.e. the maximum number of segments are being stored in primary memory, a previously stored segment is stored out to secondary memory and the new required segment is assigned the displaced segment area. The segment status bit for the displaced segment is set to an invalid state while the validity state of the required segment assigned to primary memory is set to a valid state (step 9).

Once a valid status is established for the required segment a sequence of steps 10–14 are performed for each required interpolation color value within the required segment to ensure that the required color value data is valid. Step 10 checks the status bit for each required interpolation color value. If invalid (step 11), then a valid color value is generated (step 12) and the status bit for that color value is set to a valid state (step 13). If valid, (step 11) then step 14 evaluates whether the status bits for all of the required color values in the required segment are valid. If some color value status bits for the required segment are still invalid, steps 10–14 are performed on the next required color value for that segment.

Once all color value status bits for the required segment are valid, step 15 of the method evaluates whether all of the segment status bits are valid for all required segments. If some of the segment status bits for the required segments are still invalid, then the next required segment is processed through steps 5–15 until all of its corresponding required color values are valid. Once all segments and all required color values within each segment are valid within primary memory, these required interpolation color values are accessed from primary memory by the interpolation stage 10 and are used along with the original source color value to perform the interpolation calculations to generate a destination color value (step 16). Steps 4–17 are performed on each color value until all associated source color values for the given image are processed (step 17).

It should be noted that an alternative method embodiment does not use secondary memory. In this embodiment, segments are not stored out to secondary memory when being replaced by a current required segment. Instead, the current required segment is simply assigned the primary memory space and all of the color values within that space become invalid. Furthermore, current required segments are not retrieved from secondary memory.

As can be seen the method and system embodiments shown in FIGS. 3 and 7A–7B realize both interpolation color value generation time savings and primary memory space savings.

Although the elements of the present invention have been described in conjunction with certain embodiments, it is appreciated that the invention can be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

I claim:

1. A method for performing color conversion of a set of source device color values corresponding to an image into a set of destination device color values, said method using an interpolation table having a predetermined number of associated interpolation color values, said method comprising the steps of:

allocating said predetermined number of memory locations for storing said associated interpolation color values;

establishing a status bit array wherein each bit in said array corresponds to one of said allocated memory locations and each bit indicates the validity of said associated interpolation color value stored in said corresponding allocated memory location;

processing each image source color value through the following steps:
a) determining which of said allocated memory locations store interpolation color values required to perform interpolation calculations on said each image source color value;
b) evaluating a corresponding status bit in said status bit array for each determined allocated memory location;
c) generating an interpolation color value for said each determined memory location when said corresponding status bit indicates invalid data;
d) storing said generated interpolation color value into said each determined memory location and setting said corresponding status bit to indicate valid data;
e) accessing said required interpolation color values stored in said each determined memory location to perform said interpolation calculations on said each image source device color value to generate a corresponding destination device color value when said corresponding status bit for said each determined memory location indicates valid data.

2. A color conversion system using an interpolation table having a predetermined number of interpolation color values, said system comprising:

an allocated memory area comprising said predetermined number of memory locations, each memory location being associated with and for storing an interpolation color values;

a status bit array, each bit in said array being associated with said each memory location and said each bit indicating the validity of data stored in said each memory location;

a means for setting said each bit depending on said validity of said data stored in said each associated memory location;

a means for determining which of said interpolation color values are required to perform said interpolation calculations on a given source color value;

a means for determining said associated memory location for said each required interpolation color value;

a means for performing said interpolation calculations on said given source color value by accessing said required interpolation color values stored in said each associated memory locations when said status bit for each of said required interpolation color value memory location indicates valid data;

a means for generating a required interpolation color value when said status bit for said associated memory location of said required interpolation color value indicates invalid data.

3. A method for performing color conversion of a set of source device color values corresponding to an image into a set of destination device color values, said method using an interpolation table comprising a set of segments, each segment having an associated set of interpolation color values, said method comprising the steps of:

allocating memory area for storing a given number of segments, said given number being less than said set of segments;

establishing a status bit array wherein each bit in said array corresponds to one of said set of segments and each bit indicates whether said one of said set of segments is stored in said allocated memory area, wherein when said status bit is in a valid state its corresponding one segment is stored in said allocated memory and when said status bit is in an invalid state its corresponding one segment is not stored in said allocated memory;

processing each image source color value through the following steps:
  a) determining which of said set of segments store interpolation color values required to perform interpolation calculations on said each image source color value;
  b) evaluating a corresponding status bit in said status bit array for each determined segment and generating said associated set of interpolation color values for said each determined segment when said corresponding status bit indicates said determined segment is not stored in said allocated memory area;
  c) storing said associated set of interpolation color values for said each determined segment into corresponding segment locations within said allocated memory area and setting said corresponding status bit to a valid state;
  d) accessing said required interpolation color values stored in said allocated memory area to perform said interpolation calculations on said each image source device color value to generate a corresponding destination device color value when said corresponding status bits for all of said determined segments are in a valid state.

4. The method as described in claim 3 wherein if a previously stored non-required segment is currently stored in said corresponding segment locations when storing said each determined segment into said corresponding segment locations, said each determined segment is written over said previously stored non-required segment and said corresponding status bit of said previously stored non-required segment is set to an invalid state.

5. A color conversion system using an interpolation table comprising a set of segments, each segment having an associated set of interpolation color values, said system comprising:

an allocated memory area for storing a given number of said segments, said given number being less than said set of segments;

a status bit array, each bit in said array being associated with one of said set of segments and for indicating whether said one of said set of segments is stored in said allocated memory area, wherein when said status bit is in a valid state its corresponding one segment is stored in said allocated memory and when said status bit is in an invalid state its corresponding one segment is not stored in said allocated memory;

a means for setting said each bit valid when said associated one segment is stored in said allocated memory area and setting said each bit invalid when said associated one segment is not stored in said memory;

a means for determining which of said interpolation color values are required to perform said interpolation calculations on a given source color value;

a means for determining which of said set of segments that each of said required interpolation color values are stored in;

a means for performing said interpolation calculations on said given source color value by accessing said required interpolation color values from said allocated memory area when said associated status bit for each of said determined segments of said each required interpolation color value is in a valid state;

a means for generating said associated set of interpolation color values for said each determined segment when said status bit for said each determined segment indicates it is not stored in said allocated memory area.

6. In a system including a primary memory and a secondary memory, a method for performing color conversion of a set of source device color values corresponding to an image into a set of destination device color values, said method using an interpolation table comprising a set of segments, each segment having an associated set of interpolation color values, said method comprising the steps of:

allocating a memory area in primary memory for storing a given number said segments, said given number of segments being less than said set of segments;

establishing a status bit array wherein each bit in said array corresponds to one of said set of segments and each bit indicates whether said one of said set of segments is stored in said allocated memory area, wherein when said status bit is in a valid state its corresponding one segment is stored in said allocated memory and when said status bit is in an invalid state its corresponding one segment is not stored in said allocated memory;

processing each image source color value through the following steps:
  a) determining which of said set of segments store interpolation color values required to perform interpolation calculations on said each image source color value;
  b) evaluating a corresponding status bit in said status bit array for each determined segment and;
    if said corresponding status bit for said each determined segment is in an invalid state and if said each determine segment is stored in said secondary memory, loading said each determined segment stored in secondary memory into corresponding segment locations within said allocated memory area and setting said corresponding status bit for said each determined segment loaded in said corresponding segment memory locations to a valid state; and
    if said corresponding status bit for said each determined segment is in an invalid state and if said each determine segment is not stored in said secondary memory, generating said associated set of interpolation color values for said each determined segment, storing said associated set of interpolation color values for said each determined segment into said corresponding memory segment locations, and setting said corresponding status bit for said each determined segment stored in said corresponding segment memory locations to a valid state;
  c) accessing said required interpolation color values from said allocated memory area to perform said interpolation calculations on said each image source device color value to generate a corresponding destination device color value when said corresponding status bits for all of said determined segments to an a valid state.

7. The method as described in claim 6 wherein if a previously stored non-required segment is currently stored in said corresponding segment locations when loading said each determined segment into said corresponding segment locations from said secondary memory and when storing said generated set of interpolation color values into said corresponding segment locations, said method further including the step of loading said previously stored non-required segment into said secondary memory and setting said corresponding status bit of said previously stored non-required segment to an invalid state.

8. The method as described in claim 6 wherein if a previously stored non-required segment is currently stored in said corresponding segment locations when loading said each determined segment into said corresponding segment locations from said secondary memory and when storing said generated set of interpolation color values into said corresponding segment locations, said each determined segment is loaded over said previously stored non-required segment and said corresponding status bit of said previously stored non-required segment is set to an invalid state.

9. A color conversion system using an interpolation table having an associated set of interpolation color values, said set of interpolation color values being divided into segments, each segment having an associated sub-set of said set of interpolation color values, said system comprising:

an allocated memory area having a given number of associated segment memory locations for storing said given number of said segments;

a first status bit array, each bit in said first array being associated with one of said segments indicating whether said one segment is stored in said segment memory locations;

a second status bit array, each bit in said second array being associated with and for indicating the validity of data stored in a memory location within said one segment, said each memory location being associated with one of said set of associated interpolation color values;

a means for setting said first status bit to a valid state when said one segment is stored in said segment memory locations and for setting said first status bit to an invalid state when said one segment is not stored in said segment memory locations;

a means for setting said second status bit to a valid state when said data stored in said memory location within said one segment is valid and for setting said second status bit to an invalid state when said data stored in said memory locations within said one segment is invalid;

a means for determining which of said interpolation color values are required to perform said interpolation calculations on a given source color value;

a means for determining which of said segments and which of said memory locations within said determined segments that each of said required interpolation color values are stored in;

a means for evaluating said first and second status bits to determine whether said determined segment is stored in said segment memory locations and whether said determined memory locations store valid interpolation color values;

a means for performing said interpolation calculations on said given source color value by accessing said required interpolation color values from said segment memory locations when said associated first status bits for each of said determined segments and said second status bits for said determined memory locations of said each required interpolation color value are in a valid state;

a means for generating a required interpolation color value when said second status bit for said determined memory location of said required interpolation color value is in an invalid state and storing said generated required interpolation color value into said determined memory area.

10. In a color conversion system using an interpolation table having an associated set of interpolation color values, said set of interpolation color values being divided into segments, each segment having an associated sub-set of said set of interpolation color values, a method for performing color conversion of a set of source device color values corresponding to an image into a set of destination device color values, comprising the steps of:

allocating a memory area having a given number of associated segment memory locations for storing said given number of said segments;

establishing a first status bit array, each bit in said first array being associated with one of said segments indicating whether said one segment is stored in said segment memory locations;

establishing a second status bit array, each bit in said second array being associated with and for indicating the validity of data stored in a memory location within said one segment, said each memory location being associated with one of said set of associated interpolation color values;

processing each image source color value through the following steps:

a) determining which of said segments and which of said memory locations within said determined segments store interpolation color values required to perform interpolation calculations on said each source color value;

b) performing steps 1–4 on said each determined segment:

1) checking said associated first status bit of said each determined segment;

2) if said associated first status bit is in an invalid state and if said each determine segment is stored in said secondary memory, writing said each determined segment into corresponding segment locations within said allocated memory area and then setting said associated first status bit to a valid state; and 3) if said associated first status bit is in an invalid state and if said each determine segment is not stored in said secondary memory, designating a segment memory location to said each determined segment and then setting said first status bit for said each determined segment to a valid state;

4) performing steps 5–6 on said each determined memory location within said each determined segment:

5) checking said second associated status bit of said each determined memory location;

6) generating a required interpolation color value when said second associated status bit is in an invalid state and storing said generated required interpolation color value into said each determined memory area;

c) performing said interpolation calculations on said given source color value by accessing said required interpolation color values from said segment memory locations when said associated first status bits for each of said determined segments and said second status bits for said determined memory locations of said each required interpolation color value are in a valid state.

11. The method as described in claim 10 wherein if a previously stored non-required segment is currently stored in said corresponding segment locations when writing said each determined segment into said corresponding segment locations, said method further including the step of writing said previously stored non-required segment into said secondary memory and setting said associated first status bit of said previously stored non-required segment to an invalid state.

12. The method as described in claim 10 wherein if a previously stored non-required segment is currently stored in said corresponding segment locations when writing said each determined segment into said corresponding segment locations, said each determined segment is written over said previously stored non-required segment and said associated first status bit of said previously stored non-required segment is set to an invalid state.

13. In a color conversion system using an interpolation table having an associated set of interpolation color values, said set of interpolation color values being divided into segments, each segment having an associated sub-set of said set of interpolation color values, a method for performing color conversion of a set of source device color values corresponding to an image into a set of destination device color values, comprising the steps of:

allocating a memory area having a given number of associated segment memory locations for storing said given number of said segments;

establishing a first status bit array, each bit in said first array being associated with one of said segments indicating whether said one segment is stored in said segment memory locations;

establishing a second status bit array, each bit in said second array being associated with and for indicating the validity of data stored in a memory location within said one segment, said each memory location being associated with one of said set of associated interpolation color values;

processing each image source color value through the following steps:
  a) determining which of said segments and which of said memory locations within said determined segments store interpolation color values required to perform interpolation calculations on said each source color value;
  b) performing steps 1–3 on said each determined segment:
     1) checking said associated first status bit of said each determined segment;
     2) if said associated first status bit is in an invalid state, designating a segment memory location corresponding to said each determined segment and then setting said first status bit for said each determined segment to a valid state;
     3) performing steps 4–5 on said each determined memory location within said each determined segment:
     4) checking said second associated status bit for said each determined memory location;
     5) generating a required interpolation color value when said second associated status bit is in an invalid state and storing said generated required interpolation color value into said each determined memory area:
  c) performing said interpolation calculations on said given source color value by accessing said required interpolation color values from said segment memory locations when said associated first status bits for each of said determined segments and said second status bits for said determined memory locations of said each required interpolation color value are in a valid state.

14. The method as described in claim 13 wherein if a previously stored non-required segment is currently stored in said corresponding designated segment location of said each determined segment, said associated first status bit of said previously stored non-required segment is set to an invalid state.

15. A method for performing color conversion of a set of source device color values into a set of destination device color values using an interpolation table having interpolation color values, said method comprising the steps of:

allocating memory for storing said interpolation color values;

setting an indicator which indicates whether valid data for interpolation color values in said table is stored in said allocated memory; and processing each source device color value through the following steps:
  a) determining interpolation color values required to perform interpolation calculations on said source device color value,
  b) evaluating said indicator to detect whether valid data for said required interpolation color values is stored in said allocated memory,
  c) loading valid data for said required interpolation color values into said allocated memory when said indicator indicates invalid data, and
  d) accessing said valid data for said required interpolation color values stored in said allocated memory location to perform said interpolation calculations on said source device color value to generate a corresponding destination device color value.

16. The method as described in claim 15 wherein said step of loading further includes the step of first generating said valid data for said required interpolation color values.

17. The method as described in claim 15 wherein said step of loading includes the step of transferring said valid data for said required interpolation color values from a second memory to said allocated memory.

18. The method as described in claim 15 wherein said indicator is a status bit for each location in said interpolation table.

19. The method as described in claim 15 wherein said interpolation table is divided into segments, each segment including a portion of said interpolation color values and wherein said indicator is a status bit for each segment of said interpolation color table.

20. The method as described in claim 19 wherein said indicator comprises a first status bit for each segment in the interpolation table and a second status bit for each interpolation color value within a segment.

* * * * *

UNITED STATES PATENT AND TRADEMARK OFFICE
CERTIFICATE OF CORRECTION

PATENT NO. : 5,736,989
DATED : April 7, 1998
INVENTOR(S) : Lhotak

It is certified that error appears in the above-identified patent and that said Letters Patent is hereby corrected as shown below:

In the Claims:

Claim 6, Column 14, Line 63, please delete "to an" and insert - -are in- - in its place.

Signed and Sealed this

Third Day of August, 1999

Q. TODD DICKINSON

*Attest:*

*Attesting Officer*     *Acting Commissioner of Patents and Trademarks*